United States Patent [19]

Kuroda et al.

[11] Patent Number: 4,756,515
[45] Date of Patent: Jul. 12, 1988

[54] FLUID-DAMPING VIBRATION-ISOLATING SUPPORT DEVICE

[75] Inventors: Osamu Kuroda; Kazumasa Kuze, both of Toyota; Zenji Nakajima, Okazaki; Satoshi Itoh, Toyota; Shuichi Okamoto, Tsu; Motoo Kunihiro, Tsu; Masahiro Ishigaki, Tsu, all of Japan

[73] Assignees: The Toyo Rubber Industry Co., Ltd., Osaka; Toyota Jidosha Kabushiki Kaisha, Aichi, both of Japan

[21] Appl. No.: 18,104

[22] Filed: Feb. 20, 1987

Related U.S. Application Data

[63] Continuation of Ser. No. 763,344, Aug. 7, 1985, abandoned.

[30] Foreign Application Priority Data

Aug. 7, 1984 [JP] Japan ................... 59-165228

[51] Int. Cl.$^4$ ............ F16M 5/00; F16M 13/00; B60G 15/04; F16K 15/14
[52] U.S. Cl. ................... 267/140.1; 137/854; 248/562; 267/219
[58] Field of Search .......... 267/8 R, 35, 113, 136, 267/140.1, 219, 258; 188/298; 180/300, 312; 280/671, 672, 96.1; 123/192 R, 195 A; 248/562, 566, 636, 638; 137/513.3, 854, 516.19

[56] References Cited

U.S. PATENT DOCUMENTS

| | | | |
|---|---|---|---|
| 4,159,091 | 6/1979 | Le Salver et al. | 248/562 |
| 4,383,679 | 5/1983 | Kakimoto | 267/140.1 X |
| 4,420,060 | 12/1983 | Kakimoto | 267/140.1 X |
| 4,422,779 | 12/1983 | Hamaekers et al. | 267/140.1 X |
| 4,437,653 | 3/1984 | Kakimoto | 267/140.1 |
| 4,572,490 | 2/1986 | Alciati | 267/140.1 |
| 4,588,173 | 5/1986 | Gold et al. | 267/140.1 |

FOREIGN PATENT DOCUMENTS

| | | | |
|---|---|---|---|
| 3347274 | 7/1985 | Fed. Rep. of Germany . | |
| 0124841 | 7/1983 | Japan | 267/140.1 |
| 0047541 | 3/1984 | Japan | 267/140.1 |
| 0117930 | 7/1984 | Japan | 267/140.1 |
| 0018633 | 1/1985 | Japan | 267/140.1 |

*Primary Examiner*—Andres Kashnikow
*Assistant Examiner*—Robert J. Oberleitner
*Attorney, Agent, or Firm*—Flynn, Thiel, Boutell & Tanis

[57] ABSTRACT

A fluid-damping vibration-isolating support device comprising a main support body having a rubber base member and a closed enclosure internally thereof; and a partition plate dividing the enclosure into two chambers which intercommunicate through an orifice and are filled with a liquid. The partition plate comprises a separator member and a stopper member. The separator member is formed of an outer peripheral thick wall portion having an orifice and an inner thin flat plate portion having at least one through-hole. The stopper member has two opposed plate sections provided so as to cover the through-hole and is captured to the separator member slightly movably to the degree that the plate sections are in contact with or separate from both faces of the flat plate portion. The stopper member serves to close upon low frequency vibration and open upon high frequency vibration, so that in the high frequency region rise of hydraulic pressure can be suppressed and dynamic spring rate can be lowered.

4 Claims, 2 Drawing Sheets

FLUID-DAMPING VIBRATION-ISOLATING SUPPORT DEVICE

This application is a continuation of U.S. Ser. No. 763,344, filed Aug. 7, 1985, now abandoned.

BACKGROUND OF THE INVENTION

1. Field of the Invention:

This invention relates to a fluid-damping vibration-isolating device for supporting or bearing vibrating bodies like automobile engines in a vibration-isolating manner.

2. Description of the Related Art:

In supporting engines suspended on motor car vehicles in a vibration-insulatingmanner, a vibration-isolating support device is required to meet two requirements, one of which is that damping rate is large against high-amplitude, low frequency oscillations generated at low speed and the other of which is that vibration insulating property is large against high frequency oscillations generated at high speed. However, vibrations of automobile vehicles due to low frequency oscillations and middle frequency oscillations such as cranking oscillation, idling oscillation and noises due to high frequency oscillations such as confined or muffled sound, transmission sound are contradictory to each other in property, and consequently, it is difficult to satisfy vibration-insulating performance against both properties efficiently and simultaneously.

Recently, fluid-damping vibration-isolating support devices have been adopted that allow their damping function to be shared by sealed liquid and their vibration-insulating function to be shared by a vibration-isolating base member made of a rubber elastomer which constitutes a wall of a chamber for the sealed liquid.

Prior art vibration-isolating support devices of this type are of a well-known construction in which the internal chamber defined in a main support body having a vibration-isolating base member formed of a rubber cylindrical body of divided into two chambers by means of a partition plate and the two chambers are put in communication with each other through an orifice provided in the partition plate and sealed with a liquid therein. As the partition plate, most of a prevailing ones are made of a high-rigidity material and fixed to the internal wall of the main support body in the periphery thereof.

There are further proposed support devices provided with another partition plate which is constructed of a thin film-like plate so that small amplitude vibrations in the high frequency region are easily accommodated, and some are furnished for actual use.

The former type of known devices stated above have, however, difficulties in that in the high frequency vibration region, hydraulic pressure of the liquid chamber is elevated and dynamic spring rate becomes large because of the high rigidity property and the fixed structure of the partition plate. As a consequence, confined or muffled sound is generated, impairing quietness of a car room.

On the other hand, the latter type of devices are disadvantageous in that damping properties decline against middle frequency and low frequency vibrations, and further have the problem that it is difficult to make partition plates of a diaphragm structure that have a uniform thickness and constant reliable qualities in respect of mechanical strength and properties.

Accordingly, this invention is designed for solving the drawbacks prior art support devices as stated above have. That is, a primary object of this invention is to suppress the rise of hydraulic pressure due to high frequency oscillations as well as to exhibit damping action against low frequency oscillations, thereby to avoid generation of confined sound, by using, as a member which allows the orifice to exhibit effectively damping performance against low frequency oscillations, a partition plate formed of a separator member having at least one through-hole in its inner flat plate portion and an orifice in its outer peripheral thick wall portion and of a stopper member which is capable of closing the through-hole upon low frequency oscillation and of putting the through-hole in communication upon high frequency oscillation, whereby to contribute to commercialization of motor vehicles of low vibrations and low noises.

SUMMARY OF THE INVENTION

This invention provides a fluid-damping vibration-isolating support device which comprises a main support body having a vibration-isolating base member made of a rubber elastomer and a closed enclosure internally thereof, and a partition plate having an orifice provided to divide the enclosure into two chambers filled with a liquid, wherein the partition plate is constructed of a separator member and a stopper member, the separator member being formed of an outer peripheral thick wall portion and an inner thin flat plate portion surrounded by the peripheral portion, the flat plate portion being defined with at least one through-hole and the peripheral portion having an orifice; the stopper member having two opposed plate sections provided at a clearance along both faces of the flat plate portion of the separator member so as to cover the through-hole and being slightly movably held to the separator member to the degree that the plate sections are in contact with or separate from both faces of the flat plate portion.

According to this invention, when a supported body such as an engine is oscillated, the rubber elastomer which is a vibration-isolating base member is subjected to dynamic compressive flexure and the chambers on both sides of the partition plate change their volume in a reversible manner, and at the same time, the stopper member nearly closes the through-hole of the separator member because of large vibrational amplitude. As a consequence, the flow of liquid through the orifice takes place in the one sense or the reverse sense in response to oscilations and damping function due to a throttling effect being exhibited whereby it is possible to damp effectively low frequency oscillations.

On the other hand, against high frequency oscillations, hydraulic pressures of both chambers are initially on the verge of rise while the stopper member is nearly separate from the flat plate portion of the separator member because of fast vibration and small vibrational amplitude and the liquid flow occurs through the through-hole as well as the orifice. As a result, the rise of hydraulic pressures is suppressed and the dynamic spring rate in the high frequency region can be decreased. In this way, transmission of oscillations can be effectively insulated.

This invention will be hereinafter described in more detail with reference to the accompanying drawings.

DESCRIPTION OF THE INVENTION

Figure 1:
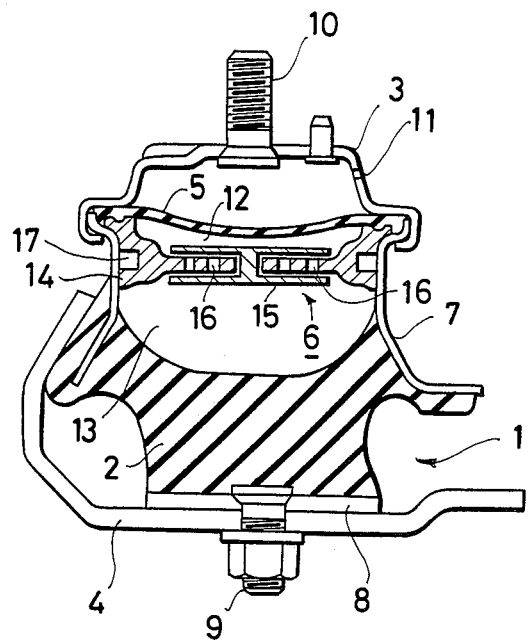
FIG. 1 is a cross-sectional elevational view of one example of this invention.
Figure 2:
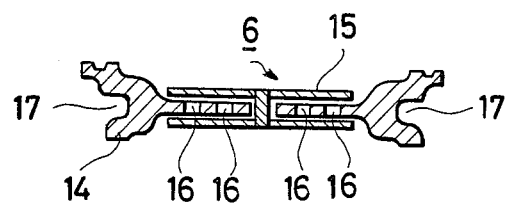
FIG. 2 is an enlarged view of a partition plate shown in FIG. 1.

The vibration-isolating support device as shown is composed of, as a primary constituent member, a main support body 1, a first bracket member 3, a second bracket member 4, a rubber plate 5 and a partition plate 6.

The main support body 1 has a vibration-isolating base member 2 made of a rubber elastomer block, one side of which is secured to a cylindrical metal body 7 and the other side of which is secured to a flat metal plate 8 having an attaching bolt 9 fitted in its middle portion, respectively in an integral manner by vulcanization moulding.

The first bracket member 3 assumes a hat shape and has an attaching bolt 10 fitted in its central portion. The peripheral portion of the first bracket member 3 is integrally secured to the main body 1 by resting the peripheral portion on the edge portion of the cylindrical body 7 in a covering manner and then caulking.

The first bracket member 3 is pierced, at its appropriate portion, by a small aperture 11 constituting a passage for air.

The second bracket 4 is a metal plate assuming nearly an L-shape and unitedly secured to the main body 1 in such a way that it is attached to abut on the vibration-isolating base member 2 from sideward and put in surface contact with the flat metal plate 8 and then, the attaching bolt 9 is received in the flat metal plate to fasten to it.

The rubber plate 5 is transversely disposed so as to cover and shield the open end of the cylindrical body 7 of the main support body 1. Its peripheral portion is also held by the edge of the cylindrical body 7 and the peripheral portion of the first bracket member 3 whereby the rubber plate is secured, at its periphery, to the main support body 1 air-tightly.

Inside the main support body 1 thus constructed, there is defined an internal chamber of sealed structure whose surrounding wall is formed of the inner face of the vibration-isolating base member 2, the internal wall of the cylindrical body 7 and one-side face of the rubber plate 5. In this internal chamber, the partition plate 6 is transversely provided to divide the chamber into upper and lower chambers 12, 13.

The partition plate 6 is composed of a separator member 14 and a stopper member 15.

Figure 3:
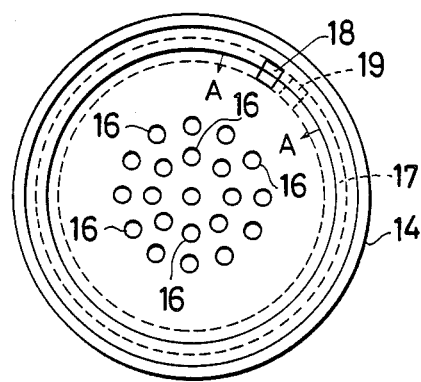
FIG. 3 is a front view of a separator member of the partition plate shown in FIG. 2.
Figure 4:
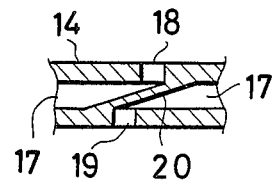
FIG. 4 is a cross-sectional view taken along A—A line of FIG. 3.

The separator member 14 is disk-shaped and formed of an outer peripheral thick wall portion and an inner thin flat plate portion. The flat plate portion is apertured by at least one through-hole 16. The peripheral thick wall portion is defined with a recess 17 circumferentially extending over nearly the whole circumference, and the recess 17 is divided by at least one oblique plate portion 20 to constitute an annular passage nearly over the circumference. By the oblique plate portion 20, there are provided a communication hole 18 entering from the one end of the passage through the peripheral portion to front on the chamber 12 and a communication hole 19 entering from the other end of the passage through the peripheral portion to front on the chamber 13 (Cf. FIG. 3 and FIG. 4).

The separator member 14 thus constructed is pressed against and fitted to the interior surrounding wall of the main support body 1, preferably the interior surrounding wall of the metal cylindrical body 7 thereby to fix the separator member. By reason of the fixing, the aforesaid recess 17 constitutes a passage putting the chambers 12, 13 in communication with each other, thus being formed as an orifice which allows the liquid to flow in reversible manner.

In the example as illustrated in FIG. 3, the separator member 14 is apertured at the flat plate portion with twenty communication holes 16 of small radius in dispersed manner.

The stopper member 15 consists of two plate sections capable of covering the flat plate portion having the through-hole 16 and a joint section for interconnecting them in parallel to one another, thus having a transverse H-form in section. The joint section is entered into a hole provided in the center of the flat plate portion of the stopper member 14 to obstruct fluid flow therethrough, and the two plate sections are arranged alongside both faces of the flat plate portion and connected to the joint section, whereby the stopper member 15 is held and captured to the separator member 14.

It is required that the stopper member 15 be held to the separator member 14 to be slightly movable to the degree that its two plate sections are in contact with or slightly separate from the flat plate portion of the separator member 14. It should be avoided to hold or arrest the stopper member to the separator member in a close contact state all the time.

The separator member 14 may be either of rigid material such as metal (e.g. aluminum) or of elastomeric material such as rubber, whereas the stopper member 15 may be either of elastomer or rigid material, but is desirable to be made of elastomer where the stopper member is captured at such a slight clearance that it is nearly in contact with the flat plate portion.

The partition plate 6 thus constructed is fabricated into a vibration-isolating support device, in the chambers 12, 13 of which a liquid such as non-freezing liquid is filled and sealed. Thus, a liquid-damping vibration-isolating mount device is completed.

When this vibration-isolating support device is, for instance, attached in order to support engines of automobiles, high frequency oscillations during running are accommodated basically by the vibration-isolating base member 2 and consequently, confined sound or transmission sound can be well absorbed.

On the other hand, low and middle frequency oscillations such as idling oscillation are effectively accommodated by reversible flowing of liquid through the orifice between two chambers 12, 13. Since these oscillations have a large vibrational amplitude, the stopper member 15 closes the through-hole 16, with one of the plate sections always being in contact with the flat plate portion, as a result of which flow of liquid is performed solely by means of the orifice 17.

In the high frequency vibration region of a low vibrational amplitude, the hydraulic pressures of the chambers 12, 13 usually rise. However, the stopper member 15 is susceptible to vibration, the vibration of it prolongs the open state of the through-hole 16 and flow of liquid takes place also through the through-hole 16, so that hydraulic pressures of the chambers 12, 13 come into decrease. The dynamic spring rate, therefore, becomes small and confined sound or transmission sound can be absorbed and prevented from invading a car room.

As for vibration-isolating characteristics, relationship of frequency (Hz) and dynamic spring rate (kg/mm) was compared by measurements between the example of this invention and a comparative example wherein a partition plate formed of a rigid body is used instead of the partition plate 6 in this invention.

Figure 5:
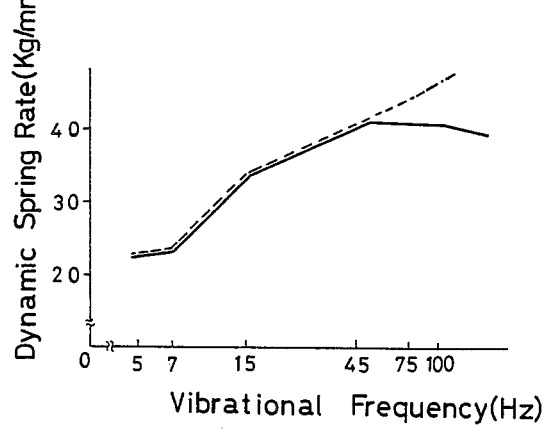
FIG. 5 is a diagram showing dynamic spring rate of one example of this invention as compared with that of a comparative example.

The results are shown in FIG. 5 wherein the solid line shows this invention and the broken line comparative example. As will be apparent from it, in the low frequency region, there is substantially no difference whereas in the middle and high frequency regions exceeding over 45 Hz, the example of this invention can bring a substantial decrease in dynamic spring rate. Thus it is possible to impart the performance of insulating confined or muffled sound in the middle and high frequency oscillation regions to a substantial degree.

As described above, this invention provides a fluid-damping vibration-isolating support device in which a partition plate 6 having an orifice 17 is provided to divide a closed enclosure into chambers filled with a liquid, characterized in that the partition plate is formed of a separator member 14 having at least one through-hole 16 and a stopper member 15 having a valve function of closing the through-hole upon occurrence of low frequency oscillations and of opening it upon occurrences of high frequency oscillations. Hence, it is possible to suppress the rise of hydraulic pressure in the high frequency oscillation region and at the same time, to belittle dynamic spring rate, which affords a superior insulation property against muffled sound and transmission sound. In the case of automobile vehicles, invasion of noises from engine is prevented, and quietness of the car room is maintained.

Further, against the low frequency oscillations, the orifice 17 exhibits its inherent function of flowing of liquid, so that effective vibration-damping can be done.

Thus, insulating performance against vibrations extending over a wide range of low, middle and high frequencies can be sufficiently exhibited.

It is further noticeable in this invention that the partition plate is of a thick and easily mouldable construction, in contrast to conventional thin partition plates such as diaphragm, and hence not only can its production cost be curtailed, but also a long life device having such a reliable performance that maintenance is not required over a long period of time can be provided.

The embodiments of the invention in which an exclusive property or privilege is claimed are defined as follows:

1. A fluid-damping vibration-isolating support device which comprises a main support body having a vibration-isolating base member made of a rubber elastomer and an enclosure member mounted on said base member and defining a closed chamber, and a partition plate means for dividing said chamber into two sub-chambers which are in communication with each other through an orifice provided in said partition plate means, said two sub-chambers being hermetically filled with a liquid;

said partition plate means comprising a separator member formed of an outer peripheral thick wall portion and an inner thin flat plate portion surrounded by said peripheral portion, said thin flat plate portion having at least one hole therethrough and without any obstruction therein and at least one further hole, said outer peripheral thick wall portion having said orifice therein; and a stopper member having two opposed impervious plate sections opposing both faces of said flat plate portion of said separator member and overlaying said hole and said further hole, said plate sections being connected together by a joint section extending through said one further hole, said connected plates being freely slightly movable in unison toward and away from said separator member to the degree that said plate sections are at least one of (1) in face-to-face contact with said faces of said flat plate portion to block fluid communication through said hole and said further hole and (2) separated therefrom to facilitate fluid communication through at least said one hole.

2. A fluid-damping vibration-isolating support device as claimed in claim 1, wherein said separator member is disk-shaped, and said orifice comprises a first communication aperture opening into one sub-chamber, a second communication aperture opening into the other sub-chamber and an annular passage formed in said peripheral portion which extends between said first and second apertures whereby said sub-chambers intercommunicate through said first and second communication apertures and said annular passage.

3. A fluid-damping vibration-isolating support device as claimed in claim 1, wherein said at least one hole in said thin flat plate portion is without any obstruction therein.

4. A fluid-damping vibration-isolating support device as claimed in claim 3, wherein said further hole is centrally oriented in said thin flat plate portion.

* * * * *